Nov. 29, 1960 N. KARPF 2,961,937
CAMERA HOLDING HANDLE
Filed Aug. 5, 1957 4 Sheets-Sheet 1

Inventor
Nikolaus Karpf
By Michael S. Striker

Nov. 29, 1960   N. KARPF   2,961,937
CAMERA HOLDING HANDLE
Filed Aug. 5, 1957   4 Sheets-Sheet 2

Inventor
Nikolaus Karpf
By Michael S. Struker
agt.

Nov. 29, 1960   N. KARPF   2,961,937
CAMERA HOLDING HANDLE
Filed Aug. 5, 1957   4 Sheets-Sheet 3

Inventor
Nikolaus Karpf
By Michael S. Striker

Nov. 29, 1960  N. KARPF  2,961,937
CAMERA HOLDING HANDLE

Filed Aug. 5, 1957  4 Sheets-Sheet 4

Inventor
Nikolaus Karpf
By Michael S. Striker

United States Patent Office 2,961,937
Patented Nov. 29, 1960

2,961,937

CAMERA HOLDING HANDLE

Nikolaus Karpf, Georg-Kalb Strasse 11, Munich-Grosshesselohe, Germany

Filed Aug. 5, 1957, Ser. No. 715,479

5 Claims. (Cl. 95—86)

Many photographic cameras, especially cameras of major size, are fitted with holding handles designed to permit a camera to be firmly held in a steady position in cases in which the use of a tripod cannot be contemplated. In the case of known devices of the type indicated, the handle is rigidly connected with the camera, the result being that it is only in the case of pictures being taken with the lens facing in a horizontal direction that the hand of the camera user can assume a natural and comfortable position. However, where the lens faces in a direction other than horizontal, for example upwardly or downwardly, the hand of the camera user has to be turned according to the camera position. This produces an uncomfortable position of the hand and particularly of the wrist which has to support the weight of the camera, the result being that the hand can no longer hold the camera steady for satisfactory pictures, it being necessary in such cases to use a tripod.

According to the present invention, the aforementioned deficiency is eliminated by the provision of a camera holding handle which is adapted to be rotated in relation to the camera to which it is attached. This affords an important advantage in that the camera may be brought into any desired position without the photographer having to remove his hand from a natural and convenient position.

These and other objectives and advantages of the invention will be apparent during the course of the following specification, when read in connection with the accompanying drawings, in which.

Figures 1, 2:
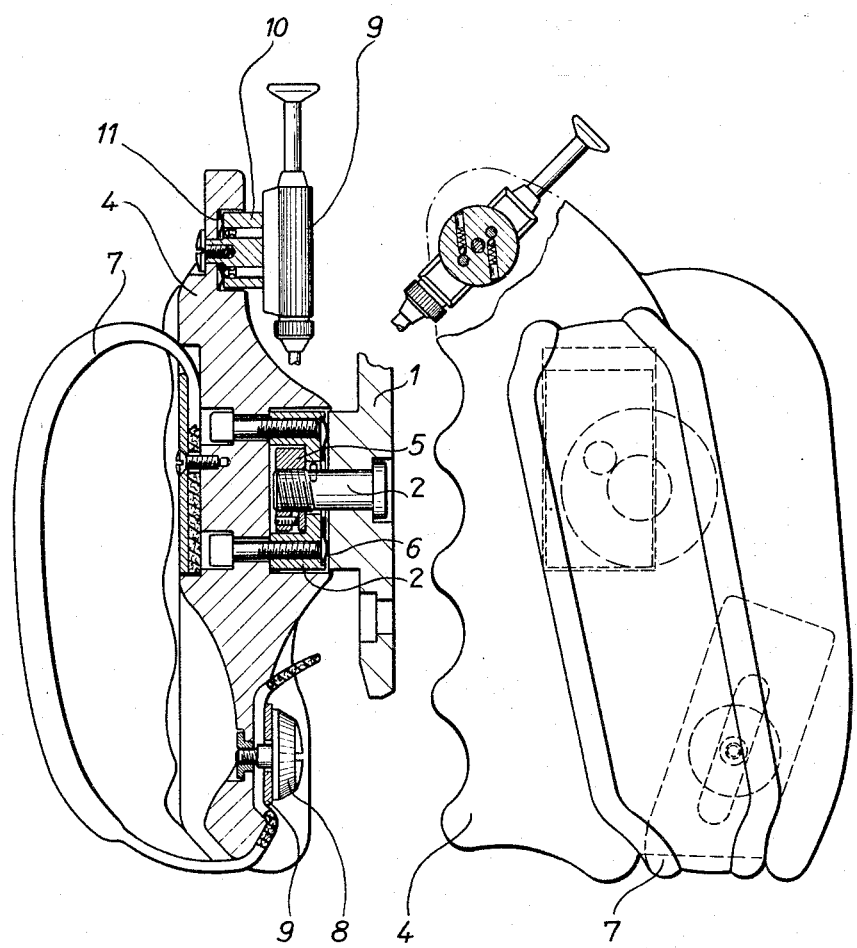
Fig. 1 is a vertical cross-sectional view, partly in elevation, of an embodiment of the camera holding handle of the invention.
Fig. 2 is a side elevational view of the camera holding handle of Fig. 1.

In Fig. 1, the reference numeral 1 indicates a plate member which is rigidly secured to the camera body. Mounted in a hole provided in plate 1 and held against rotation relative thereto is a bolt 2 carrying a nut 5 which is firmly locked to the threaded portion of the bolt; this nut 5 is received in a recess provided in disc member 2 which is rigidly secured to the camera holding handle 4, so that a rotatable connection is established between the handle 4 and the plate 1 and hence the camera. Interposed between the flanged disc member 2 and the plate 1 is a corrugated washer 6 affording smooth rotation of the handle in relation to its pivot. As will be seen in Fig. 1, the handle 4 is shaped to fit the inside of the human hand as snugly as possible so that the handle can be firmly grasped and permits the camera to be held steady. In addition there is attached to the handle 4 a leather loop or strap which surrounds the hand holding the camera handle, assisting the hand in steadying the camera.

According to the invention, the leather strap 7 is made adjustable for the most convenient length by the provision of a longitudinal slot adjacent one end thereof and of a screw 8 extending through the said slot. The screw 8, which is releasably attached to the holding handle, permits pressure to be exerted on a plate 9 which, in turn, presses the end of the leather strap against the body of the handle so as to retain the strap in a position giving the desired length. This adjustability of the strap which, in the present form, constitutes a novel feature in holding handles for photographic cameras, affords an advantage in that it eliminates the use of the conventional inconvenient holes in the leather strap by means of which conventional straps are hooked to the handle; moreover, the length of the leather strap of the instant embodiment can be easily and quickly adjusted for maximum convenience.

It is very convenient if the rotatable handle 4 also carries holding means for a wire release 9 as shown in Figs. 1 and 2. An additional advantage is obtained by providing a corrugated washer 11 between the wire release mounting means 10 and the body of the camera handle to permit the wire release to be rotated into a position in which it can be operated with maximum convenience.

Figure 3:
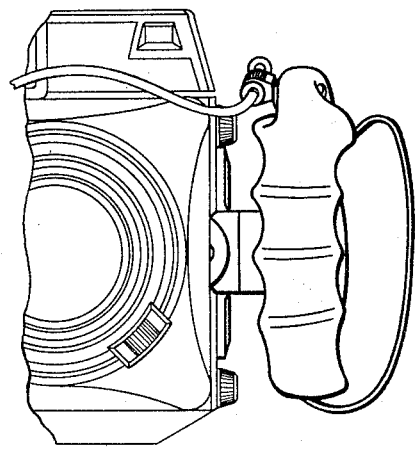
Fig. 3 illustrates one method of attaching the handle to a camera and also shows approximately the relative size of the handle and the camera.
Figure 4:
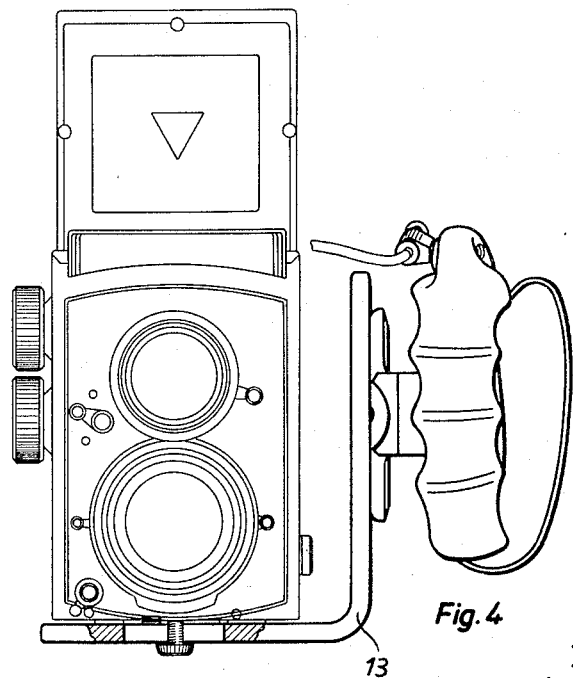
Fig. 4 shows an alternative embodiment of the means serving to connect the handle with the camera.

Instead of attaching the plate 1, in relation to which the handle 4 is rotatable, directly to the camera as shown in Fig. 3, the said plate may also be connected with a sturdy angular bracket 13 as shown in Fig. 4, the camera being attached to the free end of said bracket by means of a screw or the like. This latter embodiment has the advantage that a given camera holding handle may be used with cameras of any desired picture size.

Figure 5:
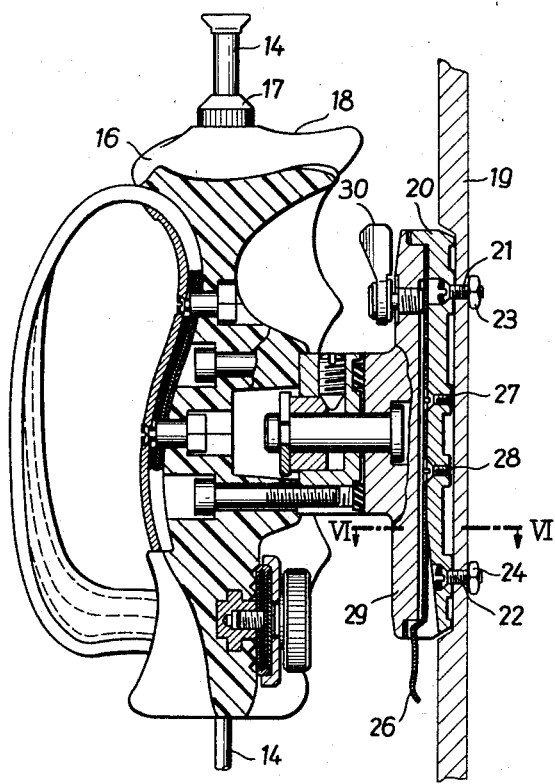
Figs. 5 to 8 show another alternative embodiment of the invention.
Figure 6:
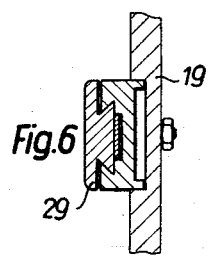
Figures 7, 8:
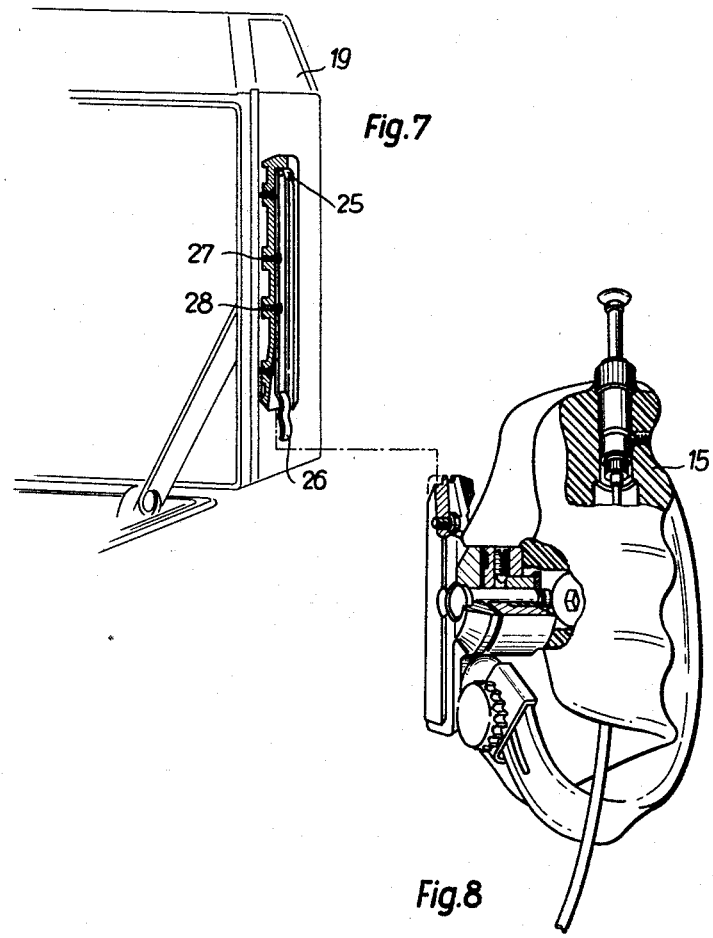

Figs. 5 to 8 inclusively show still another embodiment of the camera holding handle of the invention which will be described in detail in the following. With this embodiment, the wire release 14 extends through a hole 15 (Fig. 8) in the holding handle 16. The hole 15 opens at the upper portion of the handle where the cross-section of the latter is a maximum. The wire release is secured within the hole 15 by means of a plug-in type mount 17 (Fig. 5). The remaining portion of the wire release extends freely through the handle in a downward direction and emerges from the lower side of the handle. In addition, the holding handle is provided with a trough-like formation 18 in which the thumb of the user may rest as long as it is not intended to operate the wire release button.

The present embodiment is further differentiated from the embodiments described earlier in that the holding handle is mounted on the camera in a different manner. Attached to the camera body 19, as by screws 21, 22 and nuts 23, 24, is a mounting element 20 having formed therein a dovetail-shaped tapering groove 25 (Fig. 7) at the bottom of which there is disposed a leaf spring 26. This leaf spring is attached to the mounting element in any suitable manner, for example by two screws 27, 28. The said groove 25 is adapted to receive, from a wider side thereof, a complementary mounting member 29 which is rigidly connected with the holding handle 16, and which is also of dovetail shape to match the shape of the groove. The mounting member 29 for insertion into the mounting element 20 is mounted for rotation relative to the holding handle. The leaf spring 26 is adapted to lock the mounting element 20 and the mounting member 29 together so as to prevent inadvertent disengagement. In addition, there is provided on the mounting member 29 a wing screw 30 which may be tightened down to provide the necessary clamping action.

The primary advantage afforded by the embodiment just described resides in the fact that the handle can be quickly detached from the camera. It will be appreciated that it is convenient to provide for the handle to be detachable whenever it is intended to place the camera in a packing case or to use it on a tripod. Moreover, the detachability feature proves advantageous where a photographer owns several cameras of different picture size. In that case, the photographer will be in a position to use the same holding handle with any of his cameras, provided only that all of the cameras concerned have been fitted with a mounting element 20 of the type described.

It will be understood that modifications and variations may be effected without departing from the scope of the novel concepts of the present invention, but it is understood that the application is to be limited only by the scope of the appended claims.

I claim:

1. In a photographic camera, in combination, a camera body, a camera-holding handle attached to said body, said handle being rotatably movable relative to said body between a plurality of picture-taking positions of said handle; strap means attached to said handle at two spaced points thereof for securing said handle to a hand gripping the same, said strap means being formed with a longitudinal slot; and fastening means on said handle extending from the surface thereof and including a fastening head adapted to pass through said slot and adjustable relative to said surface for clamping said strap means between said head and said surface.

2. In a photographic camera, in combination, a camera body; a camera-holding handle; releasable fastening means attachable to said camera body for fastening said handle to said camera body; rotatable joint means interposed between said fastening means and said camera handle, said fastening means including a mounting element having a dove tail-shaped groove and fixedly attached to said camera, a mounting member fixedly fastened to said rotatable joint means and having a dove tail-shaped projection for releasable engagement of said groove, said handle being rotatably movable relative to said body between a plurality of picture taking positions, the movement of said handle being in a plane parallel to the optical axis of the camera; and leaf spring means longitudinally arranged in said groove for securing said mounting member to said mounting element in the engaged position thereof.

3. In a camera as set forth in claim 2, clamping screw means for releasably securing said mounting member to said mounting element in the engaged position thereof.

4. In a photographic camera, in combination, a camera body, a camera-holding handle attached to said body; and rotatable joint means interposed between said camera body and said camera-holding handle, said joint means including an elongated member fastened to said body, said member having a portion longitudinally projecting from said body and a laterally extending head portion at the end of said longitudinally projecting portion remote from said body, a member fastened to said handle and formed with a cavity therein of a size so as to permit rotation therein of said head portion, and communicating with a free surface of the last-mentioned member by a passage of a size sufficient for passage therethrough and rotation therein of said longitudinally projecting portion but retaining said head portion, said handle being rotatably movable relative to said body between a plurality of picture-taking positions of said handle.

5. In a camera as set forth in claim 4, friction means interposed between said head portion and an adjacent wall of said cavity for preventing spontaneous rotation of said head portion in said cavity.

References Cited in the file of this patent

UNITED STATES PATENTS

| | | |
|---|---|---|
| 1,645,923 | Ohlau | Oct. 18, 1927 |
| 1,972,000 | Warner | Aug. 28, 1934 |
| 2,140,050 | Hart | Dec. 13, 1938 |
| 2,660,103 | Culp | Nov. 24, 1953 |
| 2,780,156 | Thevenaz | Feb. 5, 1957 |
| 2,793,573 | Cuchet | May 28, 1957 |